US012405626B2

(12) United States Patent
Thakur

(10) Patent No.: US 12,405,626 B2
(45) Date of Patent: Sep. 2, 2025

(54) BANDGAP CELL

(71) Applicant: Renesas Electronics Corporation, Tokyo (JP)

(72) Inventor: Nishant Singh Thakur, Broxbourne (GB)

(73) Assignee: Renesas Electronics Corporation, Tokyo (JP)

( * ) Notice: Subject to any disclaimer, the term of this patent is extended or adjusted under 35 U.S.C. 154(b) by 271 days.

(21) Appl. No.: 18/082,697

(22) Filed: Dec. 16, 2022

(65) Prior Publication Data

US 2024/0201722 A1 Jun. 20, 2024

(51) Int. Cl.
*G05F 3/30* (2006.01)
*G05F 3/22* (2006.01)

(52) U.S. Cl.
CPC . *G05F 3/22* (2013.01); *G05F 3/30* (2013.01)

(58) Field of Classification Search
CPC ..... G05F 3/10; G05F 3/16; G05F 3/20; G05F 3/22; G05F 3/24
See application file for complete search history.

(56) References Cited

U.S. PATENT DOCUMENTS

| | | | | |
|---|---|---|---|---|
| 4,506,208 A * | 3/1985 | Nagano | G05F 3/30 | |
| | | | 327/535 | |
| 6,853,164 B1 * | 2/2005 | Prinz | G05F 3/30 | |
| | | | 320/121 | |
| 10,496,122 B1 | 12/2019 | Gottapu et al. | | |
| 11,815,927 B1 * | 11/2023 | Qin | G05F 3/30 | |
| 2014/0015509 A1 * | 1/2014 | Gupta | G05F 3/30 | |
| | | | 323/313 | |
| 2016/0274617 A1 | 9/2016 | Wadhwa | | |
| 2022/0057825 A1 * | 2/2022 | Shiina | G05F 3/265 | |

OTHER PUBLICATIONS

Bandgap voltage reference, https://en.wikipedia.org/wiki/Bandgap_voltage_reference, 4 pages, retrieved on Nov. 21, 2022.

* cited by examiner

*Primary Examiner* — Gary L Laxton
(74) *Attorney, Agent, or Firm* — SCULLY, SCOTT, MURPHY & PRESSER, P.C.

(57) ABSTRACT

A self-starting bandgap cell for generating a reference voltage.

14 Claims, 6 Drawing Sheets

BANDGAP CELL

BACKGROUND

The present disclosure relates to a bandgap cell for generating a reference voltage. In particular, the present disclosure relates to a bandgap cell that is self starting.

FIG. 1 is a schematic of a known bandgap cell 100 with start-up circuitry 102. The bandgap cell 100 comprises transistors 104, 106; a bipolar junction transistor (BJT) 108; an amplifier 110 comprising BJT transistors 112, 114 and additional circuitry 116; and resistors 118, 120, 122. A bandgap cell, such as the bandgap cell 100, may be used to generate a reference voltage Vbg on a chip.

If no current is flowing in the bandgap cell 100 then the system will do nothing, and no reference voltage Vbg will be generated. A start-up process is used, as provided by the start-up circuitry 102, where a bias current Ibias is injected into the bandgap cell 100. Current will build up in the system and reach a stable settling point. At this point the cell will operate and a reference voltage will be generated.

The start-up circuitry 102 may not function well when the bandgap cell 100 is operable using nanoampere currents (for example when the operating current is less than 100 nA. This is because the start-up circuitry 102 cannot easily detect nanoampere current levels in the main bandgap cell 100 meaning that the start-up circuit 102 can get activated when the bandgap cell 100 is already in operation, and the circuitry 102 may remain engaged, thereby interfering with main circuit operation, or it may erroneously detect small current in the bandgap cell and not engage at all and the bandgap cell will fail to start-up

SUMMARY

It is desirable to provide a bandgap cell for generating a reference voltage that reduces the issues of known start-up techniques.

According to a first aspect of the disclosure there is provided a self-starting bandgap cell for generating a reference voltage.

Optionally, the self-starting bandgap cell is configured to provide the reference voltage.

Optionally, the self-starting bandgap cell comprises a negative threshold transistor configured to provide an operating current when coupled to a supply voltage, the reference voltage being generated when the operating current flows in the self-starting bandgap cell.

Optionally, the negative threshold transistor is an NMOS transistor or a PMOS transistor.

Optionally, the self-starting bandgap cell comprises an amplifier comprising a first input terminal, a second input terminal and an output terminal, the output terminal being coupled to a gate of the negative threshold transistor, and a resistor string comprising a plurality of resistive elements coupled in series with the negative threshold transistor, the resistor string being coupled to the first and second input terminals of the amplifier.

Optionally, the plurality of resistive elements comprises a first resistor, a second resistor and a third resistor.

Optionally, one or both of the second and third resistors comprises a variable resistor.

Optionally, the second resistor is coupled to the first resistor at the first input terminal of the amplifier and the first resistor is coupled to the third resistor at the second input terminal of the amplifier.

Optionally, the self-starting bandgap cell comprises a first circuit component coupled to the resistor string, the first circuit component comprising a diode, an NPN bipolar junction transistor or a PNP bipolar junction transistor.

Optionally, the amplifier comprises a BJT input pair comprising a first input bipolar junction transistor, and a second input bipolar junction transistor, wherein the first input bipolar junction transistor is coupled to one of the first input terminal and the second input terminal and the second input bipolar junction transistor is coupled to the other of the first input terminal and the second input terminal, and the BJT input pair is configured to receive an amplifier bias current.

Optionally, the BJT input pair is configured to provide a first voltage at the first input terminal of the amplifier and a second voltage at the second input terminal of the amplifier.

Optionally, the BJT input pair is configured to have a BJT area ratio to provide the first voltage at the first input terminal of the amplifier and the second voltage at the second input terminal of the amplifier.

Optionally, the BJT area ratio is 1:8 or 1:4 or 2:8 or 1:16 or 2:16.

Optionally, the self-starting bandgap cell is configured to receive the amplifier bias current from external circuitry.

Optionally, the first component comprises the diode or the PNP bipolar junction transistor, and the first and second input bipolar junction transistors are PNP bipolar junction transistors.

Optionally, the first component comprises a first terminal coupled to the third resistor and a second terminal coupled to the negative threshold transistor at an output node, the reference voltage being provided at the output node during operation, a base of the first input bipolar junction transistor is coupled to the first input terminal, and a base of the second input bipolar junction transistor is coupled to the second input terminal.

Optionally, the BJT input pair is configured to provide a first voltage at the first input terminal of the amplifier and a second voltage at the second input terminal of the amplifier Optionally, the BJT input pair is configured to have an offset ratio to provide the first voltage at the first input terminal of the amplifier and the second voltage at the second input terminal of the amplifier Optionally, the BJT area ratio is 1:8 or 1:4 or 2:8 or 1:16 or 2:16.

Optionally, the first component comprises the diode or the NPN bipolar junction transistor, and the first and second input bipolar junction transistors are NPN bipolar junction transistors.

Optionally, the first component comprises a first terminal coupled to the second resistor and a second terminal coupled to a voltage terminal, the third resistor is coupled to the negative threshold transistor at an output node, the reference voltage being provided at the output node during operation, a base of the first input bipolar junction transistor is coupled to the second input terminal, and a base of the second input bipolar junction transistor is coupled to the first input terminal.

Optionally, the BJT input pair is configured to provide a first voltage at the first input terminal of the amplifier and a second voltage at the second input terminal of the amplifier Optionally, the BJT input pair is configured to have an BJT area ratio to provide the first voltage at the first input terminal of the amplifier and the second voltage at the second input terminal of the amplifier Optionally, the offset ratio is 1:8 or 1:4 or 2:8 or 1:16 or 2:16.

According to a second aspect of the disclosure there is provided a method of generating a reference voltage using a self-starting bandgap cell.

It will be appreciated that the method of the second aspect may include using and/or providing any of the features of the first aspect, or any other features as described herein, and in accordance with the understanding of the skilled person.

BRIEF DESCRIPTION OF THE DRAWINGS

The disclosure is described in further detail below by way of example and with reference to the accompanying drawings in which.

DETAILED DESCRIPTION

A band gap cell is used to generate a reference voltage that is proportional to the bandgap energy of silicon. This reference voltage is independent of supply and can have a very low-temperature coefficient. The standard bandgap cell has two stable operating points. In the operating point, a non-zero bias current level exists where bandgap voltage is available. The other stable operating point is with zero current and the cell remains off. This is why, in known systems, a startup circuit is added to inject the initial bias current and allow the circuit to come out of its zero bias current state and settle into desired bias current state. Once it reaches there, the bandgap cell can maintain its own bias current.

Figure 2B:
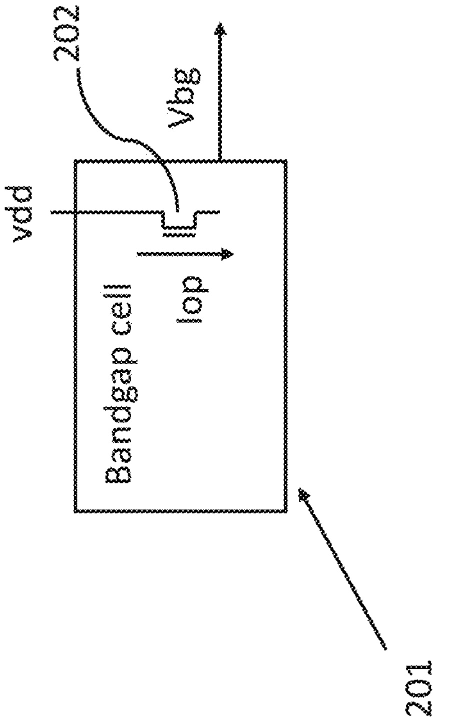
FIG. 2(*a*) is a schematic of a self-starting bandgap cell in accordance with a first embodiment of the present disclosure, FIG. 2(*b*) is a schematic of a self-starting bandgap cell in accordance with a second embodiment of the present disclosure.
Figure 2A:
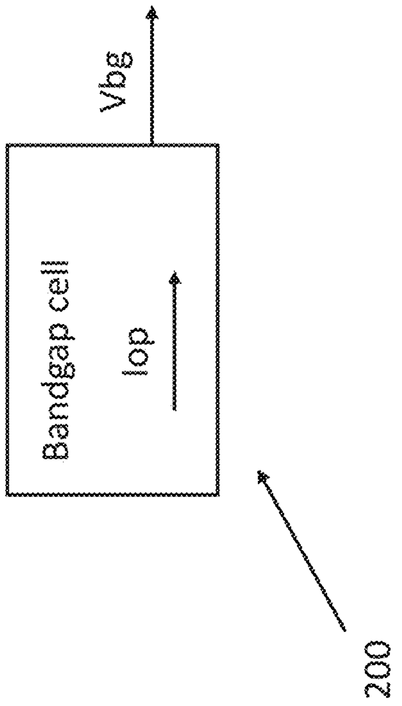

FIG. 2(*a*) is a schematic of a self-starting bandgap cell 200 for generating a reference voltage Vbg in accordance with a first embodiment of the present disclosure. The self-starting bandgap cell 200 may be configured to provide the reference voltage Vbg when the cell is enabled.

Figure 1:
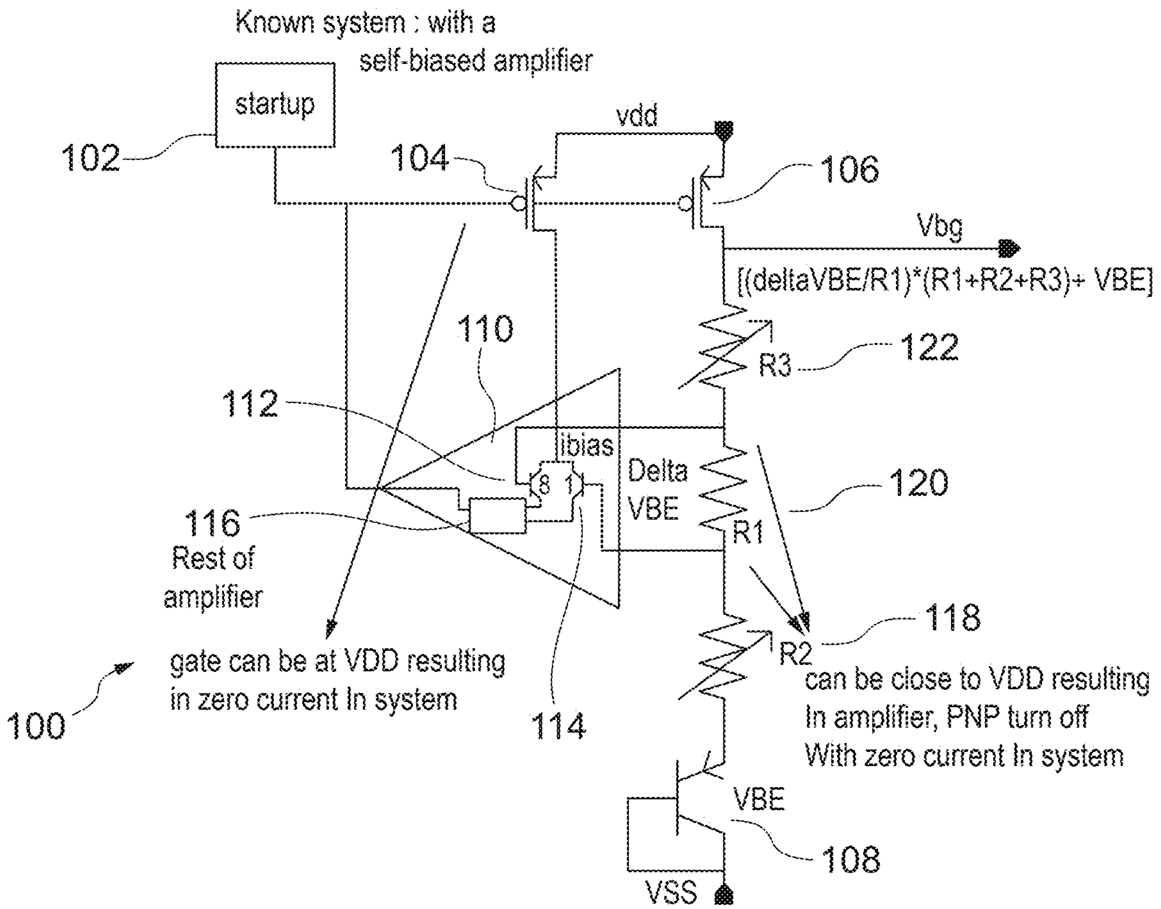
Figure 1 Prior Art
FIG. 1 is a schematic of a known bandgap cell with start-up circuitry.

The bandgap cell 200 is self-starting and therefore eliminates the requirement for auxiliary self-starting circuitry, such as the circuitry 102 as shown in FIG. 1. This means that there is reduced power consumption and reduced chip area when compared with the system 100, as the need for additional circuitry is removed. Also, the system is highly reliable. It will neither fail to start-up nor generate a reference voltage that is not accurate due to interference from the start-up circuit.

FIG. 2(*b*) is a schematic of a self-starting bandgap cell 201 comprising a negative threshold transistor 202, in accordance with a second embodiment of the present disclosure. The negative threshold transistor 202 is configured to provide the operating current Iop when coupled to a supply voltage vdd. The supply voltage vdd may, for example, be within the range 1.5V to 5.5V. The reference voltage Vbg is generated when the operating current Iop flows in the self-starting bandgap cell 201, during operation. The negative threshold transistor 202 may be an NMOS transistor. It is possible to use a negative or zero threshold PMOS in this position trying to inject current in the loop, in that polarity of feedback will need changes because a PMOS will add inversion in the loop. A negative threshold transistor is a transistor that will conduct a current even when a voltage of 0V is applied across its gate and source.

Figure 3B:
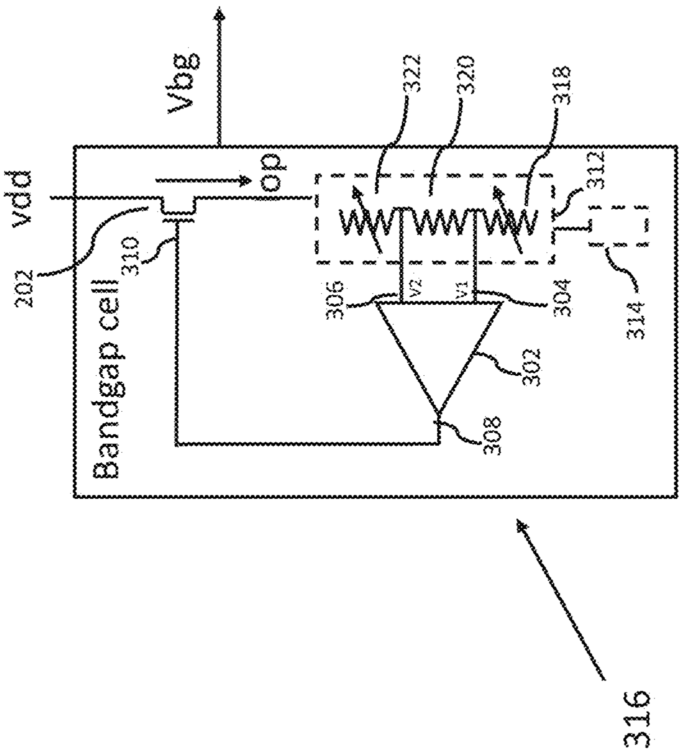
FIG. 3(*a*) is a schematic of a self-starting bandgap cell in accordance with a third embodiment of the present disclosure, FIG. 3(*b*) is a schematic of a bandgap cell in accordance with a fourth embodiment of the present disclosure.
Figure 3A:
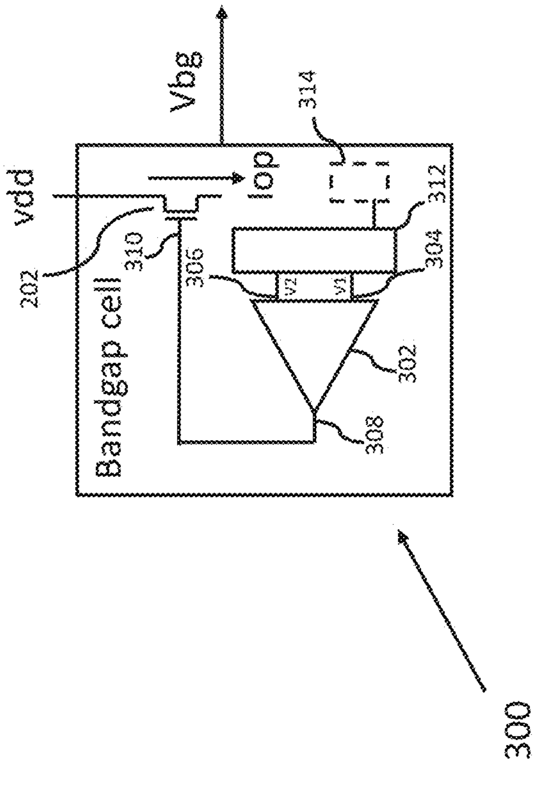

FIG. 3(*a*) is a schematic of a self-starting bandgap cell 300 in accordance with a third embodiment of the present disclosure. The bandgap cell 300 comprises an amplifier 302 comprising input terminals 304, 306 and an output terminal 308. The output terminal 308 is coupled to a gate 310 of the negative threshold transistor 202. The bandgap cell 300 further comprises a resistor string 312 comprising a plurality of resistive elements coupled in series with respect to each other and the negative threshold transistor 202. The resistor string 312 is coupled to the input terminals 304, 306.

The bandgap cell 300 may further comprises a circuit component 314 that is coupled to the resistor string 312. The circuit component 314 may comprise a diode, an NPN bipolar junction transistor or a PNP bipolar junction transistor.

FIG. 3(*b*) is a schematic of a bandgap cell 316 in accordance with a fourth embodiment of the present disclosure. In the present embodiment the plurality of resistive elements comprises resistors 318, 320, 322. One or both of the resistors 318, 322 may be variable resistors to enable trimming functionality to be provided. In the present embodiment, both the resistors 318, 322 comprise variable resistors. The resistor 318 is coupled to the resistor 320 at the input terminal 304 and the resistor 320 is coupled to the resistor 322 at the input terminal 306.

Figure 4A:
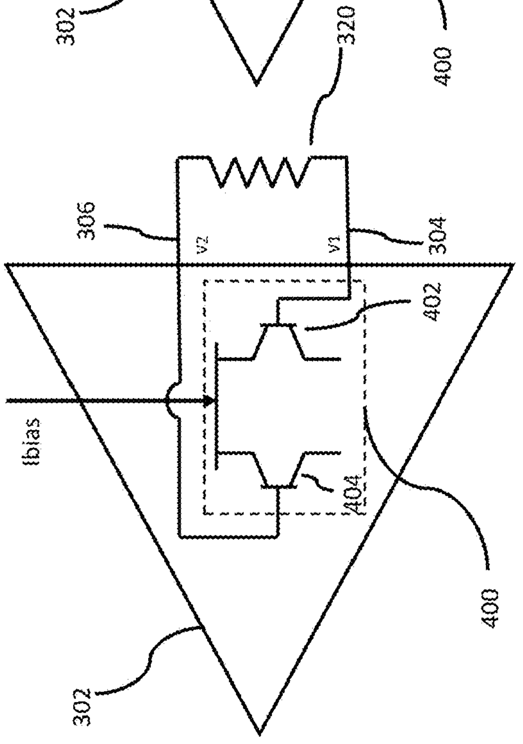
FIG. 4(*a*) is a schematic of a specific embodiment of the amplifier in accordance with a fifth embodiment of the present disclosure, FIG. 4(*b*) is a schematic of a specific embodiment of the amplifier in accordance with a sixth embodiment of the present disclosure, FIG. 4(*c*) is a schematic of a bias current generator.
Figure 4B:
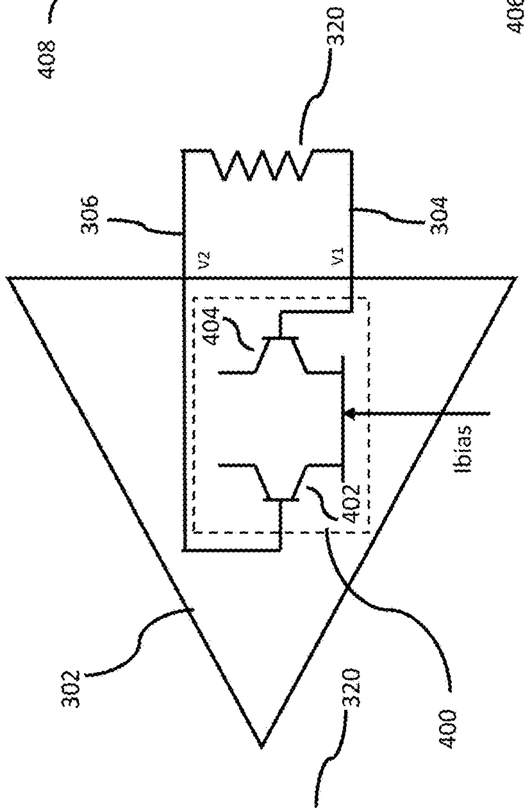
Figure 4C:
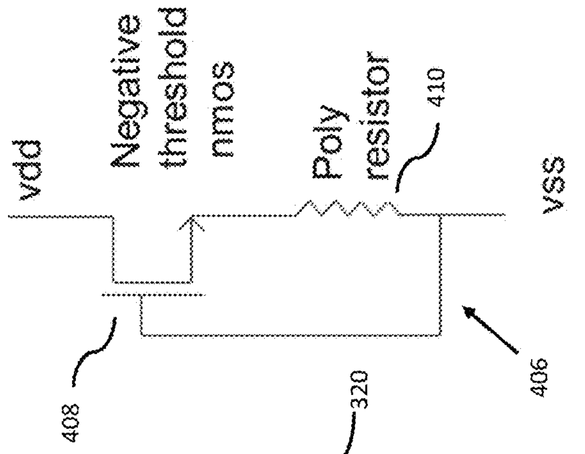

FIG. 4(*a*) is a schematic of a specific embodiment of the amplifier 302 in accordance with a fifth embodiment of the present disclosure. The amplifier 302 comprises a BJT input pair 400 comprising input bipolar junction transistors 402, 404. The transistor 402 is coupled to the input terminal 304 and the transistor 404 is coupled to the input terminal 306. The BJT input pair 400 is configured to receive an amplifier bias current Ibias. A bias current typically refers to a current that is generated and provided to other circuitry, for example on a chip, that requires the bias current for its operation. In the present example, the bias current Ibias is required for the operation of the amplifier 302. In this topology BJT's will be of PNP type.

The BJT input pair 400 may be configured to provide a voltage V1 at the input terminal 304 and a voltage V2 at the input terminal 306. This functionality may be provided by a BJT area ratio applied to the transistors 402, 404. The ratio may be 1:8 for the transistor 402: the transistor 404. It will be appreciated that in further embodiments other ratios may be used such as 1:4, 2:8, 1:16 or 2:16.

If both BJT 402, 404 are of the same size, the error amplifier loop will force V1 and V2 to be equal. But if BJT 404 is bigger in size than BJT 402 (8 times bigger in the present example), then V2 will be forced higher than V1 by the error amplifier loop. Then (V2-V1) will be a finite voltage which may be called an offset voltage.

FIG. 4(*b*) is a schematic of a specific embodiment of the amplifier 302 in accordance with a sixth embodiment of the present disclosure. In the present embodiment, the transistor 402 is coupled to the input terminal 306 and the transistor and the transistor 404 is coupled to the input terminal 304. In this topology BJT's will be of NPN type. In FIG. 4(*b*), transistor 404 is bigger in size than 402.

FIG. 4(*c*) is a schematic of a bias current generator 406 that may function as external circuitry for generating and then providing the bias current Ibias to the amplifier 302. The bias current generator 406 comprises a negative threshold transistor 408 and a poly resistor 410.

The bias current generator 406 is an example circuit for providing the amplifier bias current Ibias. The bias current generator 406 can generate a supply independent current. It uses a negative threshold NMOS device (reference numeral 408) with a resistor (reference numeral 410). Current flowing in the negative threshold transistor 408 can, for example, be mirrored and supplied to the amplifier 302 as the bias current Ibias.

As illustrated in FIG. 1, existing systems require start-up circuitry (for example as provided by the circuit 102) for injecting the initial bias current and once start up is complete bandgap cell will generate its own bias current at a stable operating point Ibias for the amplifier 110. In the present example, start-up circuitry is not required. It will be appreciated that there are other means of bias current generation that may be used, also without requiring start-up circuitry, and in accordance with the understanding of the skilled person.

Figure 5A:
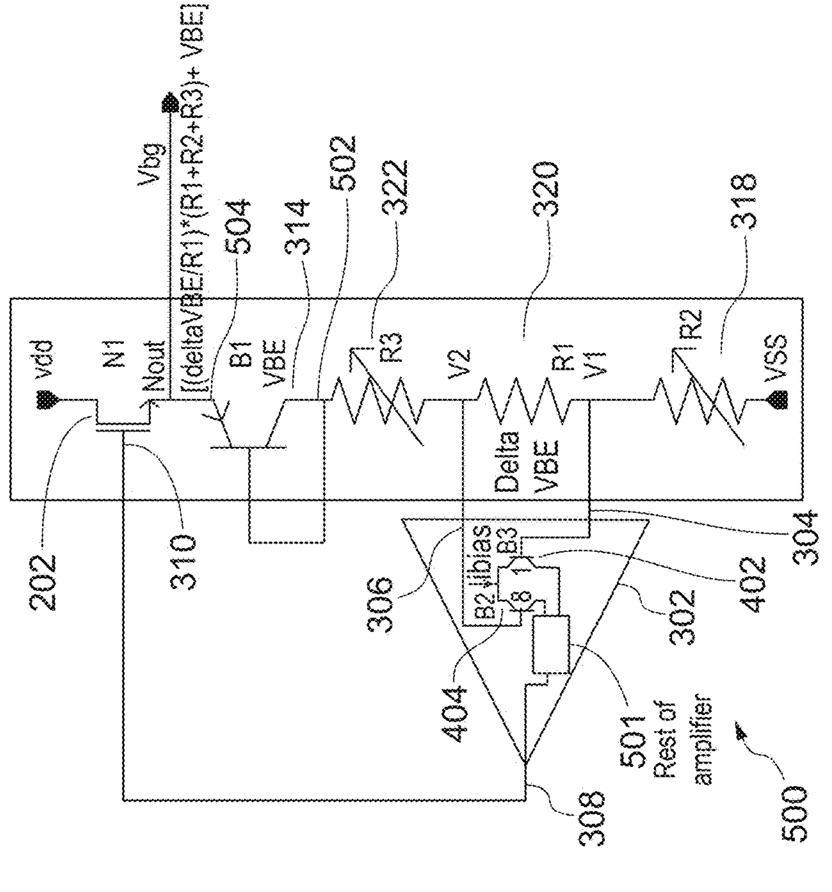
FIG. 5(*a*) is a schematic of a self-starting bandgap cell in accordance with a seventh embodiment of the present disclosure, FIG. 5(*b*) is a schematic of a self-starting bandgap cell in accordance with an eighth embodiment of the present disclosure, FIG. 5(*c*) is a schematic of a self-starting bandgap cell in accordance with a ninth embodiment of the present disclosure.
Figure 5B:
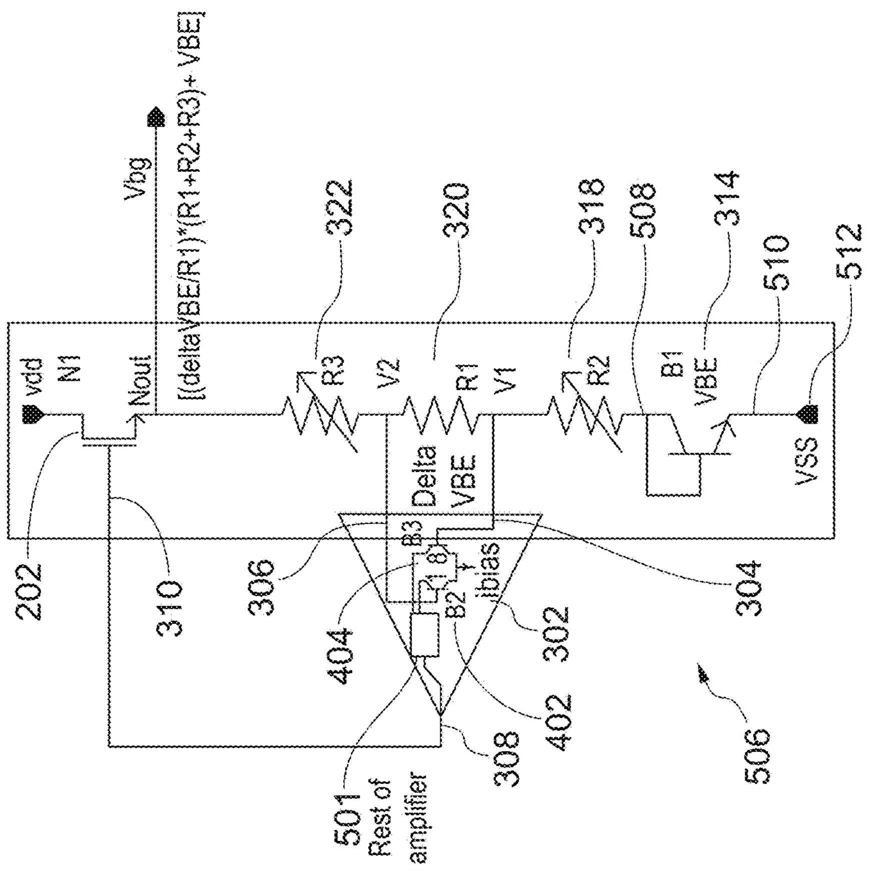
Figure 5C:
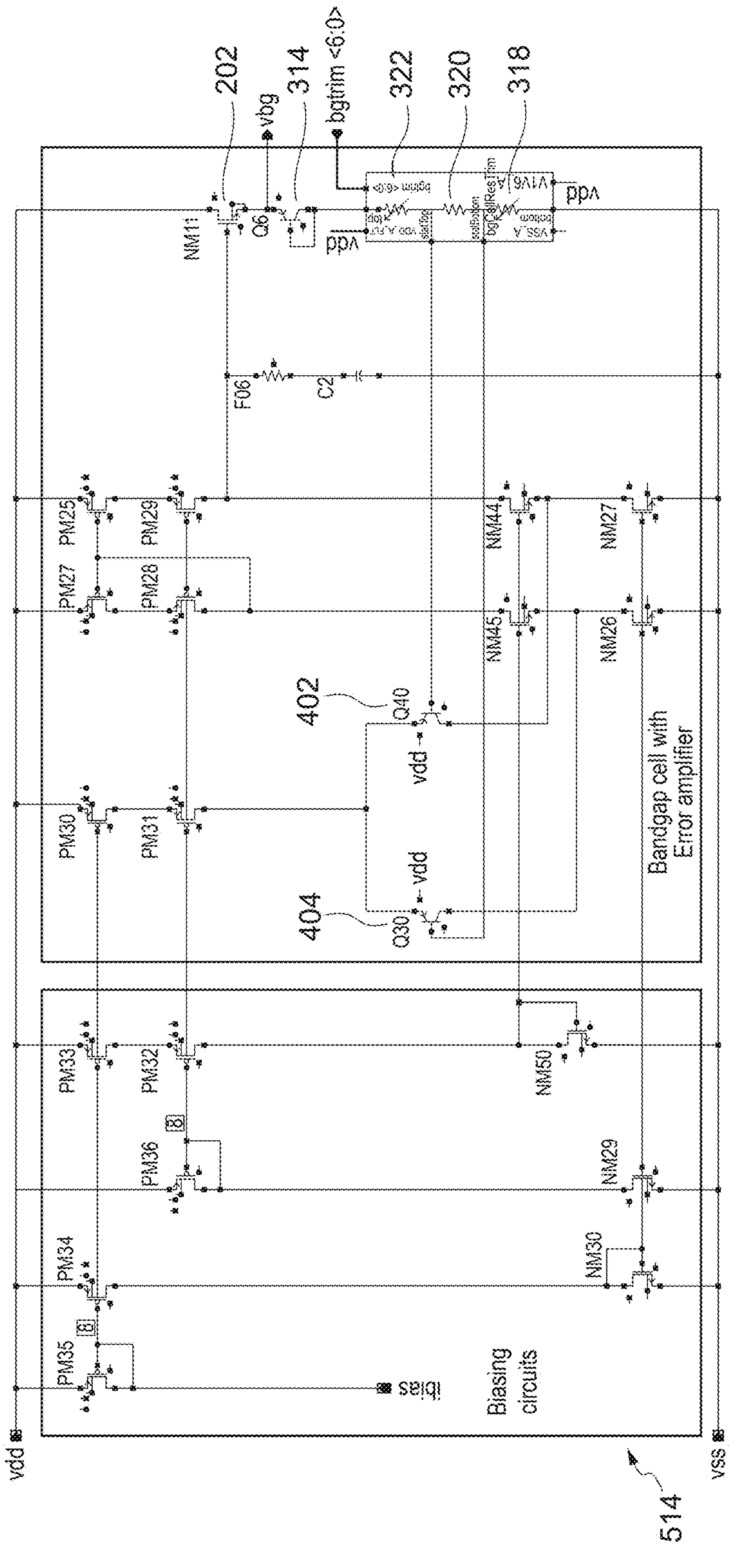

FIG. 5(*a*) is a schematic of a self-starting bandgap cell 500 in accordance with a seventh embodiment of the present disclosure. The component 314 may comprises a diode or a PNP bipolar junction transistor, with the input bipolar junction transistors being PNP bipolar junction transistors. In the present embodiment, the first component 314 comprises the PNP bipolar junction transistor.

The component 314 comprises a terminal 502 coupled to the resistor 322 and a terminal 504 coupled to the negative threshold transistor 202 at an output node Nout. The reference voltage Vbg is provided at the output node Nout during operation of the bandgap cell 500. A base of the transistor 402 is coupled to the input terminal 304 and a base of the transistor 404 is coupled to the input terminal 306.

The amplifier 302 further comprises additional circuitry 501 being coupled to the BJT input pair 402, 404 and the output terminal 308 of the amplifier 302. The additional circuitry 501 may be implemented as a folded cascode amplifier which is well-known in the art. In further embodiments, other differential amplifier topologies may be used in accordance with the understanding of the skilled person.

FIG. 5(*b*) is a schematic of a self-starting bandgap cell 506 in accordance with an eighth embodiment of the present disclosure. The component 314 may comprises a diode or a NPN bipolar junction transistor, with the input bipolar junction transistors being NPN bipolar junction transistors. In the present embodiment, the first component 314 comprises the NPN bipolar junction transistor.

The component 314 comprises a terminal 508 coupled to the resistor 318 and a terminal 510 coupled to a voltage terminal 512 at a voltage vss. The resistor 322 is coupled to the negative threshold transistor 202 at the output node Nout. A base of the transistor 404 is coupled to the input terminal 304 and a base of the transistor 402 is coupled to the input terminal 306.

The embodiment presented in FIG. 5(*a*) use a BJT input pair 402, 404 with a BJT area ratio of 1:8 to generate the voltages V1, V2 to provide ΔVBE (labelled as "Delta VBE" in the Figure) which is the voltage across the resistor 320. VBE, as shown on the Figure, denotes the base to emitter voltage of the BJT 314, which comprises a PNP BJT in FIG. 5(*a*), as discussed previously. A supply independent bias current Ibias is provided to the amplifier 302 from external circuitry (such as the bias current generator 406). It will be appreciated that in further embodiments other ratios may be used such as 1:4, 2:8, 1:16 or 2:16.

The use of the supply independent bias current Ibias from external circuitry, the negative threshold transistor 202 coupled to the supply voltage vdd, and the addition of the PNP BJT 314 positioned as shown in the Figure contribute to the provision of the operating current Iop which enables self-starting of the bandgap cell 500. The resistors 318, 320, 322 are used to generate the reference voltage Vbg (which may be referred to as the "bandgap voltage"), and may be represented as follows:

$$Vbg = ((\Delta VBE/R1) \times (R1 + R2 + R3)) + VBE \quad (1)$$

where R1, R2 and R3 denote the resistances of resistors 320, 318 and 322, respectively.

In a specific embodiment, R2 and R3 are of equal value and are trimmable (for example, as provided by the variable resistors). This arrangement allows cancellation of errors due to base current flowing into the amplifier BJTs 402, 404.

If this is not done bandgap voltage will have offset voltage. And this offset voltage will vary with temperature.

Since the negative threshold NMOS N1 (labelled 202) is a top device (positioned in an upper portion of the circuit and coupled to the supply voltage vdd), it will inject current in the output branch (formed by transistors 202, 314 and resistors 318, 320, 322) whenever a valid vdd supply is present.

We have introduced a PNP BJT B1 (labelled 314) in the output branch before we go to amplifier 302 inputs V1 and V2. This means that amplifier 302 inputs V1 and V2 will see a potential less than equal to (Vdd−VBE). (Vdd−VBE) max voltage means amplifier input pair B2 and B3 always turns on.

Since the input pair B2 (labelled 404) and B3 (labelled 402) are PNP BJT, this means they will always turn on. Because even if emitter of B2 is at Vdd, the base of B2 will be (Vdd−VBE). This means even if we ignore voltage drop in R1, R2, R3 Vbe2=(Vdd−VBE) and similarly, Vbe3=(Vdd−VBE). This is sufficient to guarantee input pairs B2 and B3 will always turn on. Since N1 (labelled 202) is guaranteed to inject some current there will be an IR drop in R3 R1 and R2, this further helps in turn on of B2 and B3 because Vbe2 and Vbe3 will further increase as IR drop increases. Vbe2 and Vbe3 denotes base to emitter voltage of the transistor 404 and 402, respectively. Thus, the bandgap cell 500 does not require a startup circuit, it is self-starting, and it will always work once the supply Vdd is applied.

Since the bias current Ibias to the amplifier 302 is supplied externally from another circuit, this further eliminates the need for a start-up circuit as we are not self-biasing the amplifier as is used in known systems. Self-biasing is a technique where ibias_main current flowing in one of the branches of the amplifier loop is mirrored back into its tail current ibias. This has a drawback that if ibias_main current is negligible its mirrored version can also be negligible and amplifier will not work causing startup failure. Therefore, embodiments of the present disclosure using external circuitry for the amplifier bias current Ibias resolves this issue in known systems.

Further embodiments may alter the arrangements of the resistors 318 and 322 without affecting the self-starting operation. However, changing arrangement of resistors 318 and 322 may cause an offset voltage in the generated bandgap voltage Vbg due to base currents of BJT's.

FIG. 5(*b*) demonstrates similar behaviour to as described in FIG. 5(*a*), as will be clear to the skilled person. For the bandgap cell 506, and compared with the circuit 500, there is provided self-starting behaviour with NPN BJT input pair B2 and B3 (labelled 402, 404). Here, B1 (labelled 314) has been moved to the bottom of the ladder.

Here N1 (labelled 202) makes sure a current is always injected in B1 (labelled 314) and thus producing VBE which is sufficient to turn ON B2 and B3 (labelled 404 and 402, respectively). Voltage drop across resistor 318 and resistor 320 further contributes to strong turn ON of B2 and B3 (labelled 404 and 402, respectively).

FIG. 5(*c*) is a schematic of a self-starting bandgap cell 514 having a specific embodiment of the error amplifier 302 comprising a folded cascode topology, in accordance with a ninth embodiment of the present disclosure.

In summary, self starting functionality is enabled by:

The negative threshold device 202 at the top

The correct proposed location of the component 314

The externally generated bias current Ibias of the amplifier 302

In summary, in known systems, auxiliary startup circuits are required to startup a bandgap cell. While is it okay to use auxiliary startup circuits when the bias current of the bandgap cell is in uA range it becomes risky and difficult for a nano ampere bandgap cell. Specifically, in nA applications traditional start up cells cannot detect nA current levels flowing in main amplifier loop meaning that they can get falsely activated and remain engaged thereby interfering with main circuit operation. Furthermore, auxiliary startup circuitry occupies chip area.

Embodiments of the present disclosure provide the following advantages;

There is provided a robust architecture that does not require a startup circuit, thereby reducing occupied chip area as would otherwise be required for auxiliary startup circuitry.

Proposed circuit is extremely useful for ultra-low power circuits as it does not require any additional power and it is guaranteed to start. It works for both nA and μA level circuits so it is a versatile reusable architecture.

Startup circuits provide an area overhead and might use some current all the time during operation. For example for a 5 nA bandgap cell even 1 nA in startup will waste 20% of overall power budget.

Proposed circuit is extremely useful for ultra-low power circuits as it does not take any additional power as would otherwise be wasted in startup cells.

It has excellent power supply rejection because the additional circuitry compared with known systems does not compromise power supply rejection property of the bandgap cell.

Common reference numerals or variables between Figures represent common features.

Various improvements and modifications may be made to the above without departing from the scope of the disclosure.

The invention claimed is:

1. A self-starting bandgap cell for generating a reference voltage, the self-starting bandgap cell comprises:

a negative threshold transistor configured to provide an operating current when coupled to a supply voltage, the reference voltage being generated when the operating current flows in the self-starting bandgap cell;

an amplifier comprising a first input terminal, a second input terminal and an output terminal, the output terminal being coupled to a gate of the negative threshold transistor, wherein the amplifier comprises a BJT input pair comprising:

a first input bipolar junction transistor; and a second input bipolar junction transistor;

a resistor string comprising a plurality of resistive elements coupled in series with the negative threshold transistor, the resistor string being coupled to the first and second input terminals of the amplifier, wherein the plurality of resistive elements comprises a first resistor, a second resistor and a third resistor; and a first circuit component coupled to the resistor string, wherein:

the first input bipolar junction transistor is coupled to one of the first input terminal and the second input terminal and the second input bipolar junction transistor is coupled to the other of the first input terminal and the second input terminal;

the BJT input pair is configured to receive an amplifier bias current;

the first circuit component comprises a first terminal coupled to the third resistor and a second terminal coupled to the negative threshold transistor at an output node, the reference voltage being provided at the output node during operation;

a base of the first input bipolar junction transistor is coupled to the first input terminal; and a base of the second input bipolar junction transistor is coupled to the second input terminal.

2. The self-starting bandgap cell of claim 1, wherein one or both of the second and third resistors comprises a variable resistor.

3. The self-starting bandgap cell of claim 1, wherein the second resistor is coupled to the first resistor at the first input terminal of the amplifier and the first resistor is coupled to the third resistor at the second input terminal of the amplifier.

4. The self-starting bandgap cell of claim 3, comprising a first circuit component comprising a diode, an NPN bipolar junction transistor or a PNP bipolar junction transistor.

5. The self-starting bandgap cell of claim 4, wherein:

the first circuit component comprises the diode or the PNP bipolar junction transistor; and the first and second input bipolar junction transistors are PNP bipolar junction transistors.

6. The self-starting bandgap cell of claim 4, wherein:

the first circuit component comprises the diode or the NPN bipolar junction transistor; and the first and second input bipolar junction transistors are NPN bipolar junction transistors.

7. The self-starting bandgap cell of claim 6, wherein:

the first circuit component comprises a first terminal coupled to the second resistor and a second terminal coupled to a voltage terminal;

the third resistor is coupled to the negative threshold transistor at an output node, the reference voltage being provided at the output node during operation;

a base of the first input bipolar junction transistor is coupled to the second input terminal; and a base of the second input bipolar junction transistor is coupled to the first input terminal.

8. The self-starting bandgap cell of claim 1, wherein the BJT input pair is configured to provide a first voltage at the first input terminal of the amplifier and a second voltage at the second input terminal of the amplifier.

9. The self-starting bandgap cell of claim 8, wherein the BJT input pair is configured to have a BJT area ratio to provide the first voltage at the first input terminal of the amplifier and the second voltage at the second input terminal of the amplifier.

10. The self-starting bandgap cell of claim 9, wherein the BJT area ratio is 1:8 or 1:4 or 2:8 or 1:16 or 2:16.

11. The self-starting bandgap cell of claim 9, wherein the BJT input pair is configured to have an offset ratio to provide the first voltage at the first input terminal of the amplifier and the second voltage at the second input terminal of the amplifier.

12. The self-starting bandgap cell of claim 11, wherein the BJT area ratio is 1:8 or 1:4 or 2:8 or 1:16 or 2:16.

13. The self-starting bandgap cell of claim 1, configured to receive the amplifier bias current from external circuitry.

14. A method comprising generating the reference voltage using the self-starting bandgap cell of claim 1.

* * * * *